(12) United States Patent
Kim et al.

(10) Patent No.: US 11,362,612 B2
(45) Date of Patent: Jun. 14, 2022

(54) POWER DEVICE OF ELECTRIC VEHICLE

(71) Applicant: LG Electronics Inc., Seoul (KR)

(72) Inventors: Youngjin Kim, Seoul (KR); Taehee Kwak, Seoul (KR); Taemin Yoon, Seoul (KR)

(73) Assignee: LG Electronics Inc., Seoul (KR)

(*) Notice: Subject to any disclaimer, the term of this patent is extended or adjusted under 35 U.S.C. 154(b) by 279 days.

(21) Appl. No.: 16/687,962

(22) Filed: Nov. 19, 2019

(65) Prior Publication Data

US 2020/0162006 A1  May 21, 2020

(30) Foreign Application Priority Data

Nov. 19, 2018 (KR) .......................... 10-2018-0143012

(51) Int. Cl.
  *H02P 27/08* (2006.01)
  *H02K 5/04* (2006.01)
  *H02K 11/33* (2016.01)
  *H02M 7/00* (2006.01)
  *H02M 7/537* (2006.01)

(52) U.S. Cl.
  CPC ............... *H02P 27/08* (2013.01); *H02K 5/04* (2013.01); *H02K 11/33* (2016.01); *H02M 7/003* (2013.01); *H02M 7/537* (2013.01)

(58) Field of Classification Search
  CPC .......... H02P 27/08; H02K 5/04; H02K 11/33; H02M 7/003; H02M 7/537; H02M 1/088; H02M 7/5387; Y02T 10/64; Y02T 10/70; Y02T 10/7072; Y02T 10/72; Y02T 90/14; B60L 50/51; B60L 15/20; B60L 53/20; B60L 2240/42; B60Y 2200/91
  USPC ...................................................... 310/68 D
  See application file for complete search history.

(56) References Cited

U.S. PATENT DOCUMENTS

| | | | |
|---|---|---|---|
| 2013/0249335 A1* | 9/2013 | Motoda ............... | B62D 5/0406 310/71 |
| 2013/0300222 A1* | 11/2013 | Nakano .................... | H02K 3/50 310/43 |
| 2014/0326530 A1* | 11/2014 | Asao ..................... | B62D 5/0403 180/443 |
| 2018/0084646 A1* | 3/2018 | Purohit ................ | H05K 5/0073 |
| 2018/0175694 A1* | 6/2018 | Keil ........................ | H02K 11/33 |
| 2020/0162006 A1* | 5/2020 | Kim ........................ | H02M 7/003 |
| 2021/0099100 A1* | 4/2021 | Sato ...................... | H02P 27/085 |

OTHER PUBLICATIONS

Microchip, AN857 (NPL), 2002.*

* cited by examiner

*Primary Examiner* — John K Kim
(74) *Attorney, Agent, or Firm* — Fish & Richardson P.C.

(57) ABSTRACT

Disclosed herein is a power device of an electric vehicle including a motor housing that is configured to accommodate a motor which generates a driving force, and an inverter housing that has the shape of a cylinder which has first and second opened surfaces, that is coupled to the motor housing such that a shaft which delivers the driving force is coupled to the motor, and that is configured to accommodate an inverter module which supplies first, second and third AC power to the motor.

16 Claims, 9 Drawing Sheets

POWER DEVICE OF ELECTRIC VEHICLE

CROSS-REFERENCE TO RELATED APPLICATIONS

This application claims priority to and the benefit of Korean Patent Application No. 10-2018-0143012, filed on Nov. 19, 2018, and, the disclosure of which is incorporated herein by reference in its entirety.

BACKGROUND

1. Field of the Invention

The present disclosure relates to a power device of an electric vehicle that includes an inverter housing and an inverter module with improved structures.

2. Description of Related Art

A vehicle that appeared as an internal combustion engine was developed is an item necessary in people's daily lives. However, vehicles are a major cause of environmental pollution, and energy scarcity caused by consumption of vast amounts of energy by them.

In recent years, electric vehicles powered by electricity, and hybrid vehicles powered by hydrogen fuel or a combination of the hydrogen fuel and the internal combustion engine have been developed and widely used, instead of vehicles powered by the internal combustion engine.

The electric vehicle (EV) may be powered by an AC motor or a DC motor that is usually driven by power of a high-voltage battery.

The electric vehicles may be classified into battery electric vehicles and hybrid electric vehicles. Motors of the battery electric vehicles may be driven by power of batteries and, when the power is discharged, the batteries may be re-charged. Batteries of the hybrid electric vehicles may be charged by operating the engine and by generating electricity, and motors of the hybrid electric vehicles may be driven by electricity, to operate the hybrid electric vehicles.

In Korean Patent Publication No. 10-2011-0053084 (published on May 19, 2011) as a related art, a power module of an electric vehicle is disclosed.

FIG. 1 is a perspective view illustrating a power module of an electric vehicle according to a related art.

Referring to FIG. 1, the power module 1 of the electric vehicle may include a power module case 2, a motor driving unit 3 that is placed in the power module case 2, and a motor 4.

The power module case 2 includes the motor driving unit 3 in the upper portion thereof, and the motor 4 in the lower portion thereof. The power module case 2 accommodates a capacitor, an inverter, and a controller in the upper portion thereof. Additionally, the lower portion of the power module case 2 has the shape of a cylinder to accommodate the motor 4.

The inverter may convert power of a battery, which is input to operate the motor 4. i.e., DC power, into AC power and may supply the AC power to the motor 4.

In this case, the inverter may include a module-type power device module that converts DC power into AC power. However, a size of a conventional module-type power device module may increase.

SUMMARY OF THE INVENTION

One aspect of the present disclosure is to provide a power device of an electric vehicle that includes an inverter housing and an inverter module with improved structures.

Another aspect of the present disclosure is to provide a power device of an electric vehicle that includes an inverter housing which has the shape of a cylinder and which has first and second opened surfaces such that a shaft which delivers a driving force may be coupled to the motor.

Yet another aspect of the present disclosure is to provide a power device of an electric vehicle that uses an inverter module which includes at least two or more power devices of low capacity in each of the first, second and third driving units separated from one another.

Objectives of the present disclosure are not limited to what has been described. Additionally, other objectives and advantages that have not been mentioned may be clearly understood from the following description and may be more clearly understood from embodiments. Further, it will be understood that the objectives and advantages of the present disclosure may be realized via means and a combination thereof that are described in the appended claims.

An inverter housing according to the present disclosure may have the shape of a cylinder that includes first and second opened surfaces such that a shaft which delivers a driving force may be coupled to a motor.

The inverter module according to the present disclosure may include first, second, and third driving units that are separated from one another, and each of the first, second, and third driving units may include first and second power device groups that include at least two or more power devices respectively.

The first and second power device groups according to the present disclosure may perform different switching-on and switching-off operations differently.

The power device of an electric vehicle according to the present disclosure includes an inverter to which a 120-degree symmetrical shape is applied for axial penetration of the shaft, and accordingly, power density may increase.

The inverter module that consists of a DC-link capacitor unit, first, second and third driving units, and a control driver includes a penetration hole in the central portion thereof and accordingly, the penetration hole through which coolants pass may be implemented as an integrated coolant passage.

The power device of an electric vehicle according to the present disclosure is provided in which an inverter housing that has the shape of a cylinder with first and second opened surfaces is coupled to a motor housing such that a shaft which delivers a driving force may be coupled to a motor, thereby reducing the entire size of the power device.

The power device of an electric vehicle according to the present disclosure is provided in which first, second and third AC power are supplied to a motor through first and second power device groups that respectively include at least two or more power devices in each of the first, second and third driving units separated from one another, thereby maintaining a balance of AC power.

The power device of an electric vehicle according to the present disclosure is provided which may distribute and supply large capacity of electric current corresponding to first, second and third AC power using at least two or more power devices, thereby making it possible to use low-cost and low-capacity power devices.

The power device of an electric vehicle according to the present disclosure is provided which includes an inverter to which a 120-degree symmetrical shape is applied for axial penetration of a shaft, thereby improving power density.

Detailed effects of the present disclosure are described below together with the above-described effects in the detailed description of the disclosure.

DETAILED DESCRIPTION OF THE INVENTION

Figure 1:
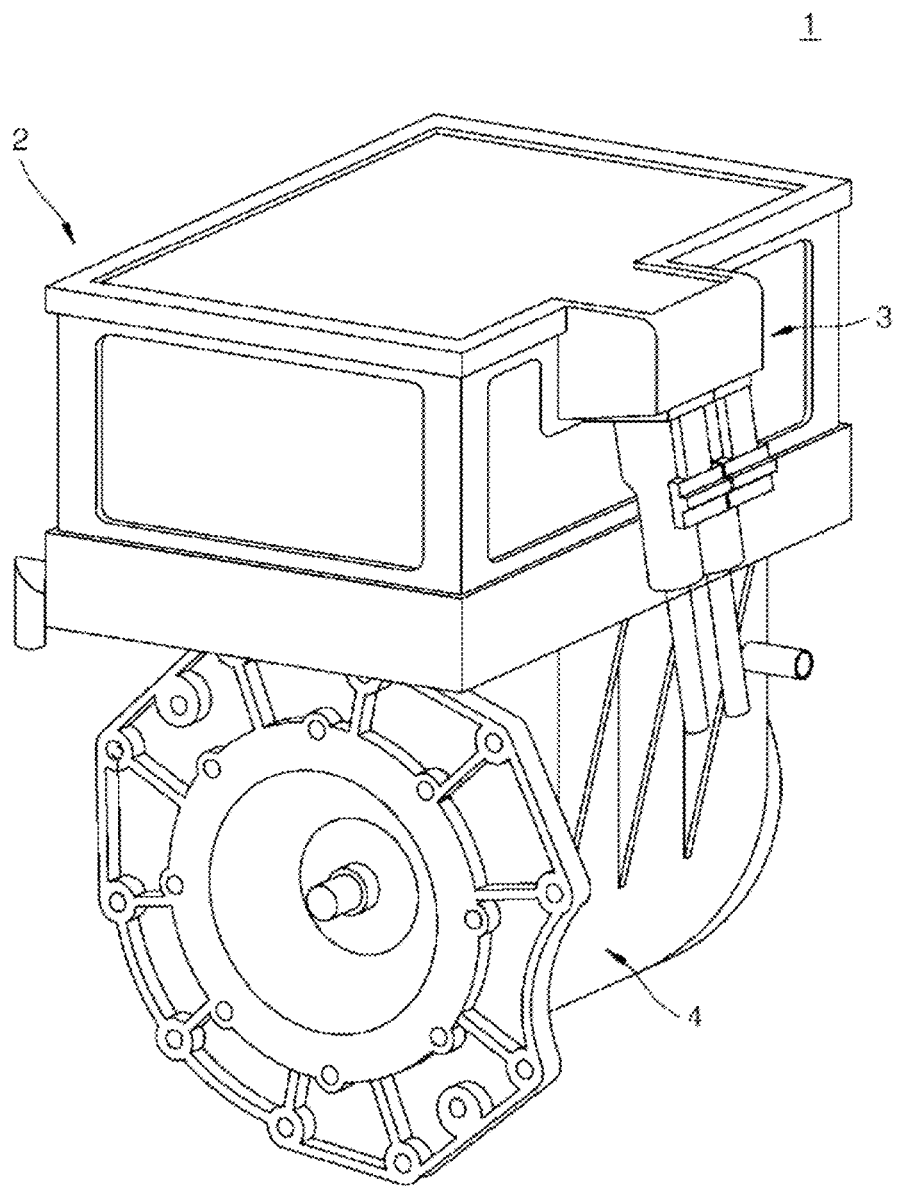
FIG. 1 is a perspective view illustrating a power module of an electric vehicle according to a related art.

The above-described objectives, features and advantages are specifically described hereunder with reference to the attached drawings. Accordingly, one having ordinary skill in the art may readily implement the technical spirit of the present disclosure. Further, in describing the present disclosure, publicly-known technologies in relation to the disclosure are not specifically described if they are deemed to make the gist of the disclosure unnecessarily vague.

Below, embodiments are specifically described with reference to the attached drawings. In the drawings, identical reference numerals denote identical or similar elements.

A power device of an electric vehicle according to an embodiment is described hereunder.

Figure 2:
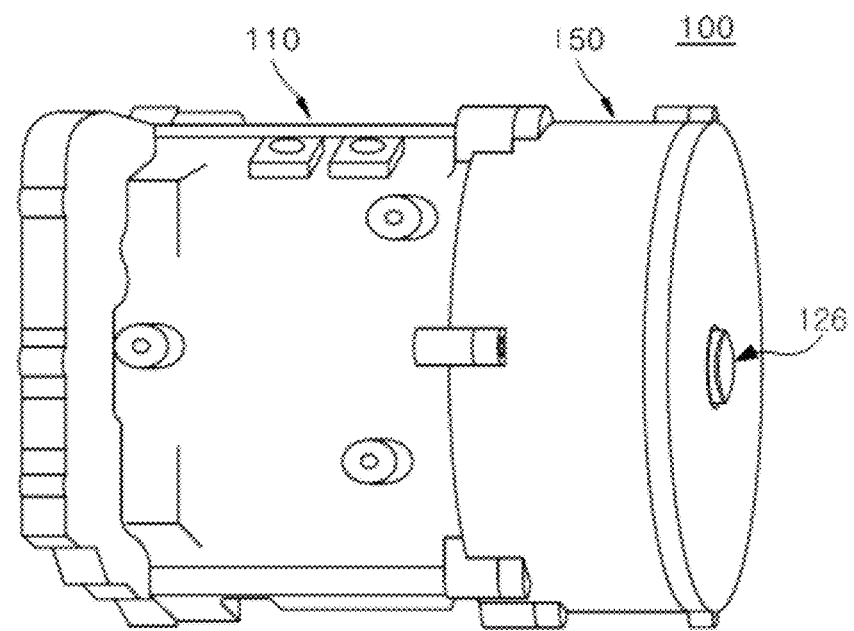
FIG. 2 is a perspective view illustrating a power device of an electric vehicle according to the present disclosure.
Figure 3:
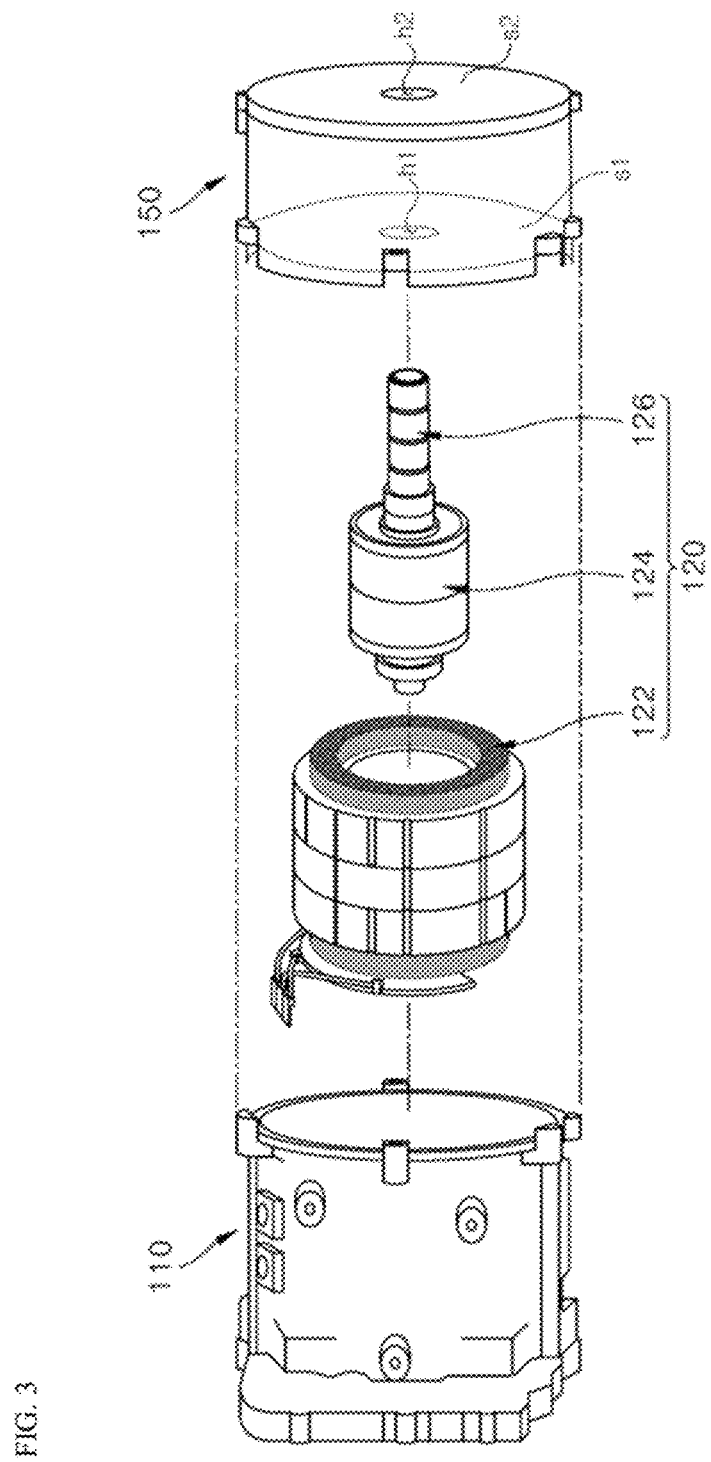
FIG. 3 is an exploded perspective view illustrating the power device of an electric vehicle in FIG. 2.

FIG. 2 is a perspective view illustrating a power device of an electric vehicle according to the present disclosure, and FIG. 3 is an exploded perspective view illustrating the power device of an electric vehicle in FIG. 2.

Referring to FIGS. 2 and 3, the power device 100 of an electric vehicle may include a motor housing 110 and an inverter housing 150.

The motor housing 110 may accommodate a motor 120. The motor 120 may include a stator 122, a rotor 124, and a shaft 126.

The stator 122 may receive first, second, and third AC power from an inverter module (illustrated in FIG. 4) that is accommodated in the inverter housing 150.

The rotor 124 may rotate and generate a driving force based on an electromagnetic force of the stator 122, which is generated by the first, second, and third AC power.

In this case, the rotor 124 may be coupled to the shaft 126 that delivers a driving force. After the shaft 126 is coupled to the motor housing 110, a part of the shaft 126 may be inserted into and may pass through first, and second holes (h1, and h2) that are formed respectively on first, and second opened surfaces (s1, and s2) of the inverter housing 150.

As an example, the motor housing 110 may include a cover (invisible) that has an opened surface, such that the motor 120 may be coupled to the rotor 124 and the shaft 126 without being exposed, after the motor 120 is accommodated.

The inverter housing 150 may be coupled to the motor housing 110 in a horizontal or perpendicular direction. The horizontal or perpendicular direction denotes a direction in which the rotor 124 and the shaft 126 are coupled.

The inverter housing 150 may have the shape of a cylinder that has the first opened surface (s1) which includes the first hole (h1), and the second opened surface (s2) which includes the second hole (h2). That is, the inverter housing 150 may have the first and second opened surfaces (s1, and s2) which include the first and second holes (h1, and h2) into which at least part of the shaft 126 is inserted and through which at least part of the shaft 126 passes, such that the shaft 126 coupled to the rotor 124 may deliver a driving force outward.

The inverter module that supplies the first, second and third AC power to the motor 120 may be accommodated in the inverter housing 150. The inverter module is specifically described hereunder with reference to FIG. 4.

The inverter housing 150 may be coupled in an axial direction of the motor housing 110, i.e., a direction of the shaft 126. Volume taken up by the inverter housing 150 in a vehicle may be reduced, and power per power density may increase. Accordingly, the vehicle may become lighter at the same power, thereby increasing fuel efficiency and vehicle miles traveled.

In the present disclosure, a coolant passage through which coolants move may be integrally formed in the motor housing 110 and the inverter housing 150 to dissipate heat generated in the motor 120, and heat generated in the inverter module included in the inverter housing 150.

Figure 4:
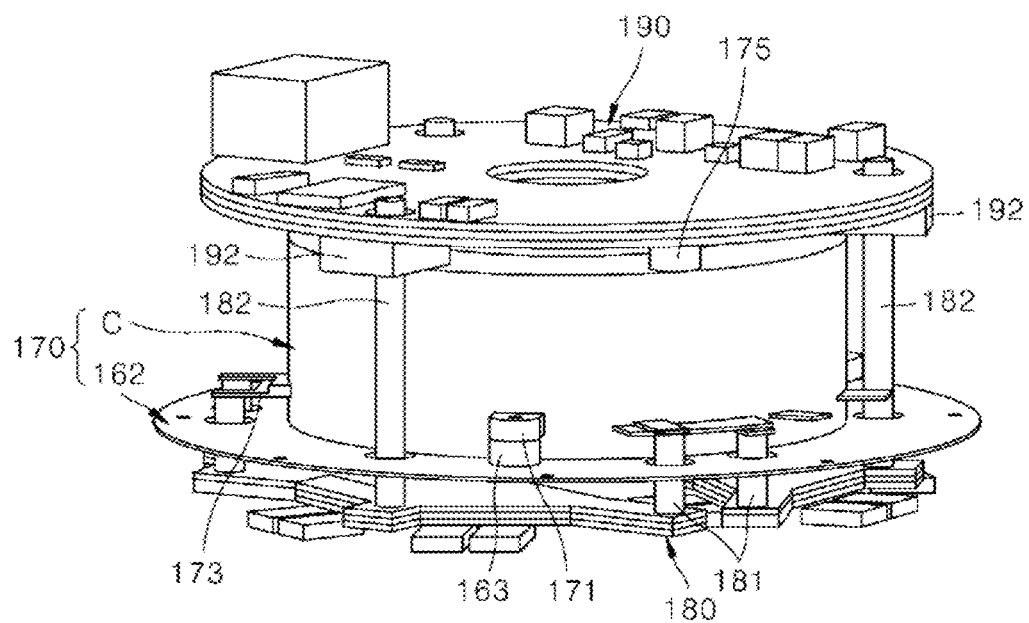
FIG. 4 is a perspective view illustrating an inverter module according to the present disclosure.
Figure 5:
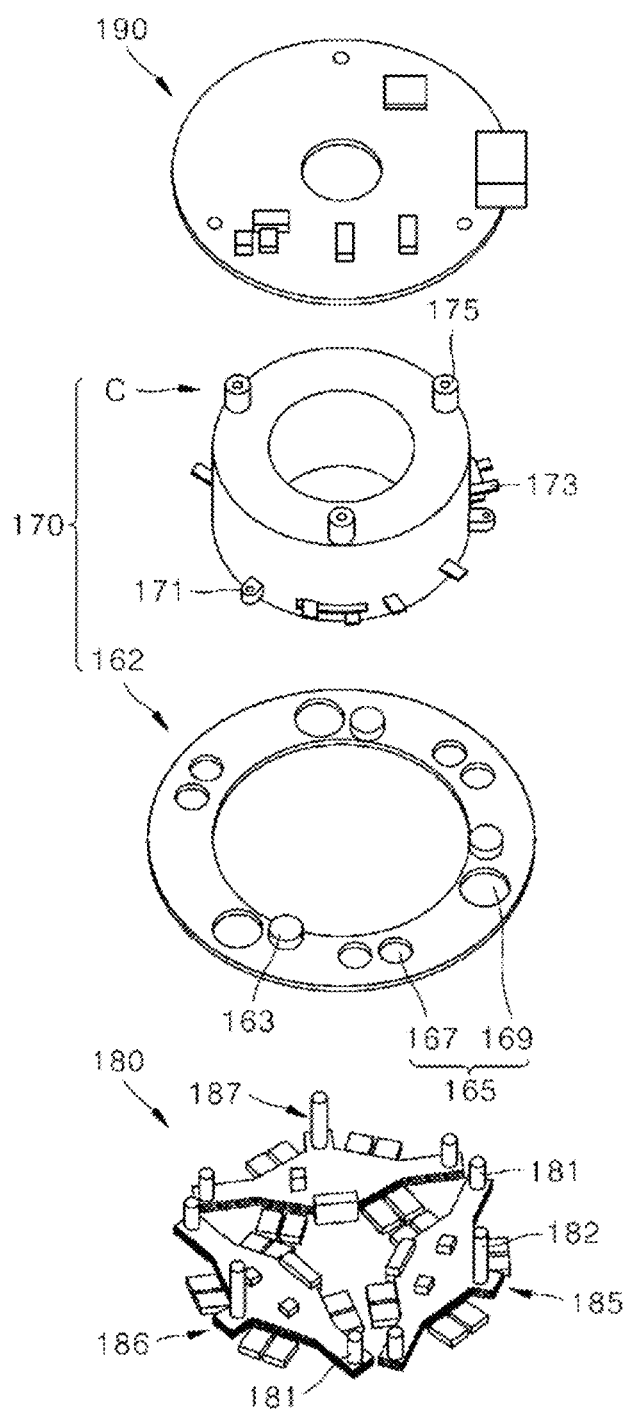
FIG. 5 is an exploded perspective view illustrating the inverter module in FIG. 4.
Figure 6:
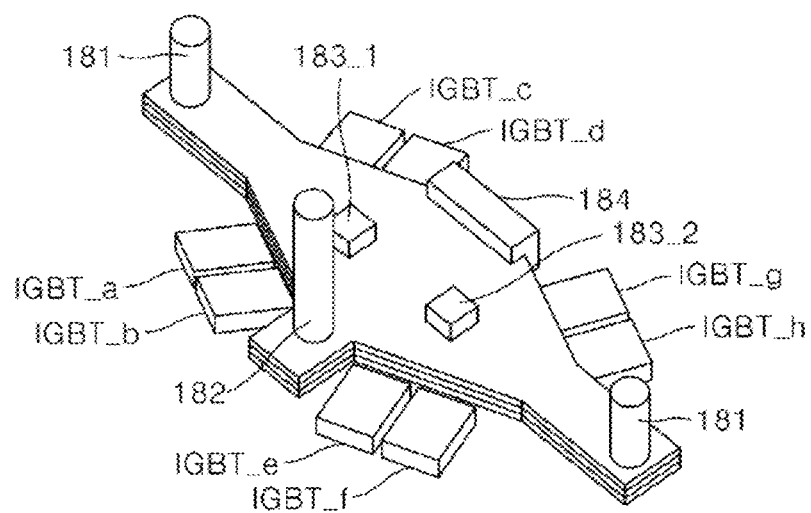
FIG. 6 is a perspective view specifically illustrating the first driving unit in FIG. 5.

FIG. 4 is a perspective view illustrating an inverter module according to the present disclosure, FIG. 5 is an exploded perspective view illustrating the inverter module in FIG. 4, and FIG. 6 is a perspective view specifically illustrating the first driving unit in FIG. 5.

Referring to FIGS. 4 to 6, the inverter module may include a DC-link capacitor unit 170, a driving unit 180, and a control driver 190.

The DC-link capacitor unit 170 may include a DC-link capacitor (C) and a support member 162.

The DC-link capacitor (C) may stabilize DC power that is input from a high-voltage battery. That is, the DC-link capacitor (C) may maintain a voltage level of the DC power uniformly.

Additionally, the DC-link capacitor (C) may have the shape of a cylinder that has an opening on both sides thereof such that the shaft 126, described with reference to FIGS. 2 and 3, may penetrate.

The cylinder-shaped DC-link capacitor (C) may include a coupling protrusion 171 and a terminal protrusion 173 that are formed on a lateral surface of the DC-link capacitor (C), and a support protrusion 175 that is formed on an upper surface of the DC-link capacitor (C).

The coupling protrusion 171 may be coupled to a coupling unit 163 that is formed on the support member 162. That is, the coupling protrusion 171 may be coupled to the coupling unit 163 and may remain separated from the driving unit 180.

Additionally, the terminal protrusion 173 may be connected in parallel with the driving unit 180 through a first conductive member 181. The driving unit 180 is described specifically below.

That is, the terminal protrusion 173 may input DC power that is supplied by a high-voltage battery to the driving unit 180.

The support protrusion 175 may support one surface of the control driver 190. In this case, a part of the support protrusion 175 may be inserted into the control driver 190.

However, the support protrusion 175 may be completely inserted into the control driver or may not be inserted into the control driver.

The support member 162 may include the coupling units 163 and penetration holes 165.

As described above, the coupling unit 163 may be coupled to the coupling protrusion 171. The coupling unit 163 may be screw-coupled to the coupling protrusion 171. However, coupling of the coupling unit 163 and the coupling protrusion 171 is not limited to screw coupling.

The penetration hole 165 may include a first penetration hole 167 through which the first conductive member 181 passes, and a second penetration hole 169 through which a second conductive member 182 passes.

The first and second penetration holes 167, 169 may have the same diameter. Additionally, the diameters of the first and second penetration holes 167, 169 may vary to correspond to diameters of the first and second conductive members 181, 182.

The driving unit 180 may include first, second and third driving units 185, 186, 187 that are separately placed near a first opened surface (s1) of an inverter housing 150.

The first driving unit 185 may convert DC power that is input to the terminal protrusion 173 into first AC power. The first driving unit 185 may include first and second power device groups, first and second gate driving units 183_1, 1832, and a connector unit 184.

The first power device group may include four power devices (IGBT_a, IGBT_b, IGBT_c, and IGBT_d). The four power devices (IGBT_a, IGBT_b, IGBT_c, and IGBT_d) may connect in parallel. Accordingly, the four power devices (IGBT_a, IGBT_b, IGBT_c, and IGBT_d) may switch on or switch off at the same point in time by a first PWM signal that is supplied by the first gate driving unit 183_1.

In this case, electric current that flows in the four power devices (IGBT_a, IGBT_b, IGBT_c, and IGBT_d) may be the same.

The second power device group may include four power devices (IGBT_e, IGBT_f, IGBT_g, and IGBT_h). The four power devices (IGBT_e, IGBT_f, IGBT_g, and IGBT_h) may connect in parallel. Accordingly, the four power devices (IGBT_e, IGBT_f, IGBT_g, and IGBT_h) may switch on or switch off at the same point in time by a second PWM signal that is supplied by the second gate driving unit 183_2.

Electric current that flows in the four power devices (IGBT_e, IGBT_f, IGBT_g, and IGBT_h) may be the same.

That is, the first and second power device groups convert DC power that is input to the first conductive member 181 into first AC power on the basis of an operation of switching-on or switching-off. Next, the first and second power device groups may output the first AC power to the second conductive member 182 and may supply the first AC power to a motor 120.

Each of the first and second power device groups may be symmetrically arranged to allow electric current to flow uniformly.

Each of the first and second gate driving units 183_1, 183_2 may generate first and second PWM signals, on the basis of control signals that are output from the control driver 190 through the connector unit 184.

As an example, each of the first and second gate driving units 183_1, 183_2 is described as driving the first and second power device groups individually. However, a single gate driving unit may drive the first and second power device groups.

The connector unit 184 may be connected with the control driver 190 by a connector line or may communication with the control driver 190.

Each of the second and third driving units 186, 187 may have the same structure as the first driving unit 185.

That is, each of the second and third driving units 186, 187 may supply second and third AC power to the motor 120 based on control by the control driver 190. A specific configuration in relation to this is omitted.

The first, second, and third driving units 185, 186, 187 may be placed in the form of a triangle. By doing so, the shaft 126 may pass through a central portion of the first, second, and third driving units 185, 186, 187. Thus, power density may increase with the structure in which the first, second, and third driving units 185, 186, 187 are symmetrically placed at an angle of 120 degrees and in which the shaft 126 penetrates an axis.

The control driver 190 may input control signals to each connector unit 184 of the first, second, and third driving units 185, 186, 187.

The control driver 190 may include a connection terminal 192 that electrically connects to the second conductive member 182. The control driver 190 may be placed near a second opened surface (s2) of the inverter housing 150.

That is, the connection terminal 192 may contact a lateral surface of the second conductive member 182. Additionally, the connection terminal 192 electrically connects with a via hole (invisible) that is formed in a printed circuit board of the control driver 190.

The control driver 190 may supply first to third AC power that are input through the via hole to the motor 120.

As described above, the inverter module includes the DC-link capacitor unit 170, the driving unit 180 and the control driver 190 that are provided with a penetration hole in the central portions thereof. Accordingly, a coolant passage through which coolants move may be implemented as an integrated coolant passage that passes through the central penetration hole to dissipate heat generated in the motor 120 and heat generated in the inverter module.

Figure 7:
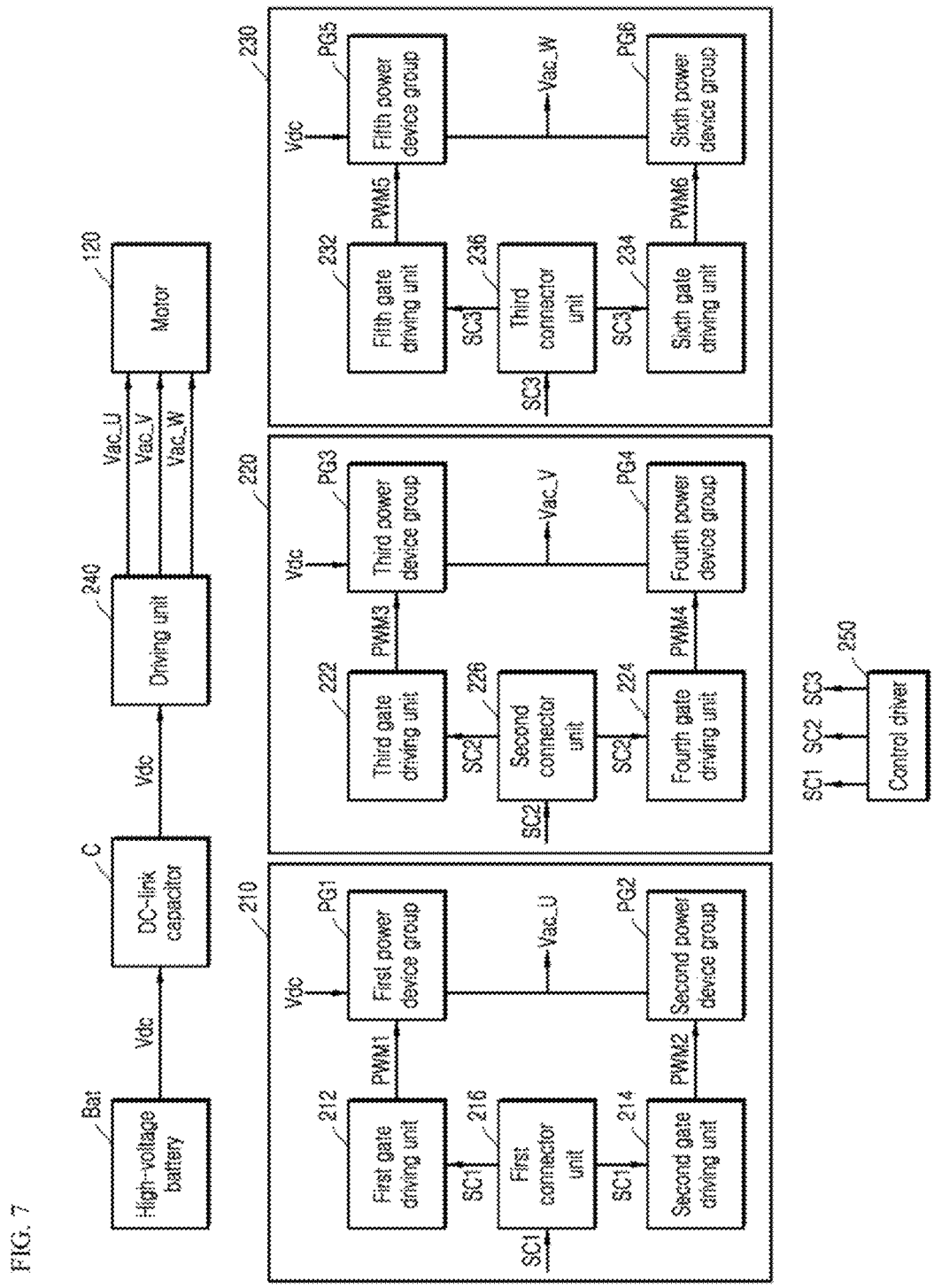
FIG. 7 is a block diagram illustrating a configuration of control of the inverter module in FIG. 4.
Figure 8:
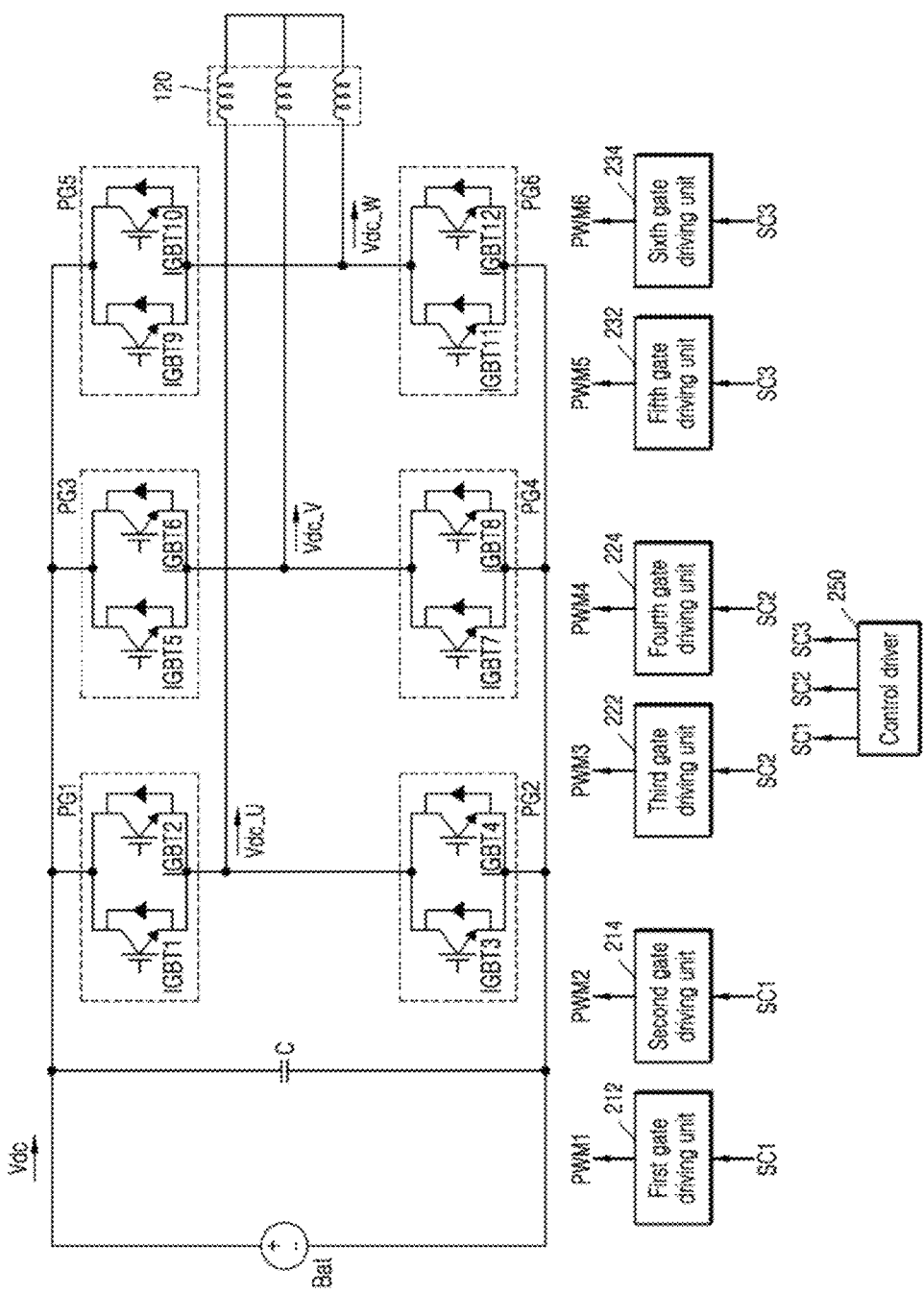
FIG. 8 is a circuit diagram of the inverter module in FIG. 4.
Figure 9:
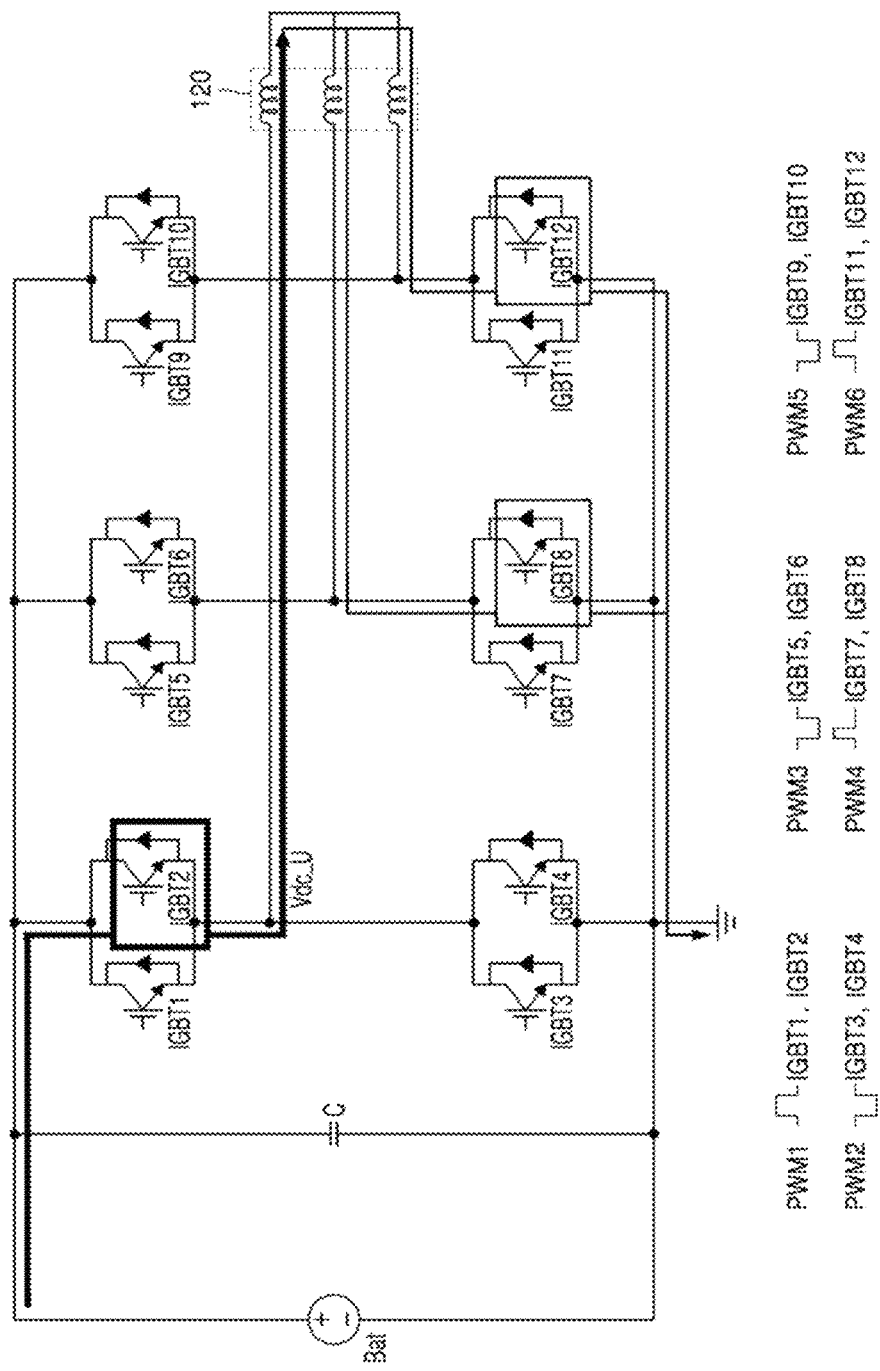
FIG. 9 is a view illustrating a current path for explaining operation of the inverter circuit in FIG. 8.

FIG. 7 is a block diagram illustrating a configuration of control of the inverter module in FIG. 4, FIG. 8 is a circuit diagram of the inverter module in FIG. 4, and FIG. 9 is a view illustrating a current path for explaining operation of the inverter circuit in FIG. 8.

Referring to FIG. 7, the inverter module may include a DC-link capacitor unit 200, a driving unit 240 and a control driver 250.

Each of the DC-link capacitor unit 200, the driving unit 240, and the control driver 250 is the DC-link capacitor unit 170, the driving unit 180, and the control driver 190 illustrated in FIGS. 2 to 6.

The DC-link capacitor unit 200 includes a DC-link capacitor (C). The DC-link capacitor (C) may stabilize DC power (Vdc) that is input from a high-voltage battery (Bat).

The driving unit 240 may include first, second and third driving units 210, 220, 230.

The first, second and third driving units 210, 220, 230 may connect in parallel with the DC-link capacitor (C). Additionally, each of the first, second and third driving units 210, 220, 230 may output first, second and third AC power (Vac_U, Vac_V, and Vac_W) to a motor 120.

As an example, the first, second and third driving units 210, 220, 230 have the same configuration.

The first driving unit 210 may include first and second power device groups (PG1, and PG2), first and second gate driving units 212, 214 and a first connector unit 216.

As an example, the first connector unit 216 may be connected with the control driver 250 by a connector, or may communicate with the control driver 250 to receive control signals.

Each of the first and second power device groups (PG1, and PG2) may switch on or switch off based on first and second PWM signals (PWM1, and PWM2) that are input from the first and second gate driving units 182, 184.

The first power device group (PG1) may supply positive cycle power of the first AC power (Vac_U) to the motor 120. Additionally, the second power device group (PG2) supplies negative cycle power of the first AC power (Vac_U) to the motor 120.

Each of the first and second power device groups (PG1, and PG2) may include at least two or more power devices that connect to each other in parallel.

The at least two or more power devices may distribute DC power (Vdc) that is input respectively to the first and second power device groups (PG1, and PG2). That is, by distributing DC power (Vdc), the at least two or more power devices may reduce inner stress.

Each of the first and second gate driving units 212, 214 may generate first and second PWM signals (PWM1, and PWM2) on the basis of the first control signal (SC1) that is input from the first connector unit 216.

As an example, each of the first and second gate driving units 212, 214 is described as generating the first and second PWM signals (PWM1, and PWM2) on the basis of the first control signal (SC1). However, a single gate driving unit may generate the first and second PWM signals (PWM1, and PWM2).

Additionally, the first and second PWM signals (PWM1, and PWM2) may be switching signals that are opposite to each other.

As described above, the first connector unit 216 may receive a first control signal (SC1) from the control driver 250.

The second driving unit 220 may include third and fourth power device groups (PG3, and PG4), third and fourth gate driving units 222, 224 and a second connector unit 226.

Like the above-described first connector unit 216, the second connector unit 226 may receive a second control signal (SC2) from the control driver 250.

Each of the third and fourth power device groups (PG3, and PG4) may switch on or switch off based on third and fourth PWM signals (PWM3, and PWM4) that are input from the third and fourth gate driving units 222, 224.

The third power device group (PG3) supplies positive cycle power of second AC power (Vac_V) to the motor 120. Additionally, the fourth power device group (PG4) supplies negative cycle power of second AC power (Vac_V) to the motor 120.

Each of the third and fourth power device groups (PG3, and PG4) may include at least two or more power devices that connect to each other in parallel.

Each of the third and fourth gate driving units 222, 224 may generate third and fourth PWM signals (PWM3, and PWM4) on the basis of the second control signal (SC2) that is input from the second connector unit 226. Additionally, the third and fourth PWM signals (PWM3, and PWM4) may be switching signals that are opposite to each other.

The third driving unit 230 may include fifth and sixth power device groups (PG5, and PG6), fifth and sixth gate driving units 232, 234 and a third connector unit 236.

Like the above-described first connector unit 216, the third connector unit 236 may receive a third control signal (SC3) from the control driver 250.

Each of the fifth and sixth power device groups (PG5, and PG6) may switch on or switch off based on fifth and sixth PWM signals (PWM5, and PWM6) that are input from the fifth and sixth gate driving units 232, 234.

The fifth power device group (PG5) supplies positive cycle power of third AC power (Vac_W) to the motor 120. Additionally, the sixth power device group (PG6) supplies negative cycle power of third AC power (Vac_W) to the motor 120.

Each of the fifth and sixth power device groups (PG5, and PG6) may include at least two or more power devices that connect to each other in parallel.

Each of the fifth and sixth gate driving units 232, 234 may generate fifth and sixth PWM signals (PWM5, and PWM6) on the basis of the third control signal (SC3) that is input from the third connector unit 236. Additionally, the fifth and sixth PWM signals (PWM5, and PWM6) may be switching signals that are opposite to each other.

As illustrated in FIG. 7, the first, second and third driving units 210, 220, 230 may have the same configuration.

Referring to FIG. 8, an inverter module may include a high-voltage battery (Bat), a DC-link capacitor (C), first, second and third driving units 210, 220, 230, and a control driver 250.

The DC-link capacitor (C) may connect to both ends of the high-voltage battery (Bat).

The first driving unit 210 may include first and second power device groups (PG1, and PG2), and first and second gate driving units 212, 214.

The first power device group (PG1) may include first and second power devices (IGBT1, and IGBT2) that connect in parallel, and the second power device group (PG2) may include third and fourth power devices (IGBT3, and IGBT4) that connect in parallel.

As an example, each of the first and second power device groups (PG1, and PG2) is described as including two power devices as shown in FIGS. 8 and 9. However, like the first and fourth power device groups in FIG. 5, each of the first and second power device groups (PG1, and PG2) may have four power devices as shown in FIGS. 5 and 6.

Each of the first to fourth power devices (IGBT1, IGBT2, IGBT3, and IGBT4) may include a drain, a gate, and a source.

DC power (Vdc) may be input to each drain of the first and second power devices (IGBT1, and IGBT2), each source of the first and second power devices (IGBT1, and IGBT2) may connect with each drain of the third and fourth power devices (IGBT3, and IGBT4), and each source of the third and fourth power devices (IGBT3, and IGBT4) may connect to ground.

A first PWM signal (PWM1) that is output from the first gate driving unit 212 may be input to each gate of the first and second power devices (IGBT1, and IGBT2). Additionally, a second PWM signal (PWM2) that is output from the second gate driving unit 214 may be input to the gate of the third and fourth power devices (IGBT3, and IGBT4).

Each of the first and second power devices (IGBT1, and IGBT2) may perform switching-on and switching-off operations in which the drain and source are opened and closed, based on the first PWM signal (PWM1) that is input to each gate of the first and second power devices (IGBT1, and IGBT2).

For instance, when the first PWM signal (PWM1) is at a high level, the first and second power devices (IGBT1, and IGBT2) may switch on to output positive cycle power of first AC power (Vac_U) to a motor 120. When the first PWM signal (PWM1) is at a low level, the first and second power devices (IGBT1, and IGBT2) may switch off to cut off positive cycle power of first AC power (Vac_U) supplied to the motor 120.

Each of the third and fourth power devices (IGBT3, and IGBT4) may perform switching-on and switching-off operations in which the drain and source are opened and closed, based on the second PWM signal (PWM2) that is input to each gate of the third and fourth power devices (IGBT3, and IGBT4).

The third and fourth power devices (IGBT3, and IGBT4) may switch on and switch off with the same method as that of the above-described first and second power devices (IGBT1, and IGBT2).

As described in FIG. 7, each of the first and second gate driving units 212, 214 may generate the first and second PWM signals (PWM1, and PWM2) on the basis of a first control signal (SC1) that is input from the control driver 250.

Additionally, the second driving unit 220 may include third and fourth power device groups (PG3, and PG4), and third and fourth gate driving units 222, 224.

The third power device group (PG3) may include fifth and sixth power devices (IGBT5, and IGBT6) that connect in parallel, and the fourth power device group (PG4) may include seventh and eighth power devices (IGBT7, and IGBT8) that connect in parallel.

Each of the fifth to eighth power devices (IGBT5, IGBT6, IGBT7, and IGBT8) may include a drain, a gate, and a source.

DC power (Vdc) may be input to each drain of the fifth and sixth power devices (IGBT5, and IGBT6), each source of the fifth and sixth power devices (IGBT5, and IGBT6) may connect with each drain of the seventh and eighth power devices (IGBT7, and IGBT8), and each source of the seventh and eighth power devices (IGBT7, and IGBT8) may connect to ground.

A third PWM signal (PWM3) that is output from the third gate driving unit 222 may be input to each gate of the fifth and sixth power devices (IGBT5, and IGBT6). Additionally, a fourth PWM signal (PWM4) that is output from the fourth gate driving unit 224 may be input to the gate of the seventh and eighth power devices (IGBT7, and IGBT8).

Each of the fifth and sixth power devices (IGBT5, and IGBT6) may perform switching-on and switching-off operations in which the drain and source are opened and closed, based on the third PWM signal (PWM3) that is input to each gate of the fifth and sixth power devices (IGBT5, and IGBT6).

For instance, when the third PWM signal (PWM3) is at a high level, the fifth and sixth power devices (IGBT5, and IGBT6) may switch on to output positive cycle power of second AC power (Vac_V) to the motor 120. When the third PWM signal (PWM3) is at a low level, the fifth and sixth power devices (IGBT5, and IGBT6) may switch off to cut off positive cycle power of second AC power (Vac_V) supplied to the motor 120.

Each of the seventh and eighth power devices (IGBT7, and IGBT8) may perform switching-on and switching-off operations in which the drain and source are opened and closed, based on the fourth PWM signal (PWM4) that is input to each gate of the seventh and eighth power devices (IGBT7, and IGBT8).

The seventh and eighth power devices (IGBT7, and IGBT8) may switch on and switch off with the same method as that of the above-described third and fourth power devices (IGBT3, and IGBT4).

As described in FIG. 7, each of the third and fourth gate driving units 222, 224 may generate the third and fourth PWM signals (PWM3, and PWM4) on the basis of a second control signal (SC2) that is input from the control driver 250.

The third driving unit 230 may include fifth and sixth power device groups (PG5, and PG6), and fifth and sixth gate driving units 232, 234.

The fifth power device group (PG5) may include ninth and tenth power devices (IGBT9, and IGBT10) that connect in parallel, and the sixth power device group (PG6) may include eleventh and twelfth power devices (IGBT11, and IGBT12) that connect in parallel.

Each of the ninth to twelfth power devices (IGBT9, IGBT10, IGBT11, and IGBT12) may include a drain, a gate, and a source.

DC power (Vdc) may be input to each drain of the ninth and tenth power devices (IGBT9, and IGBT10), each source of the ninth and tenth power devices (IGBT9, and IGBT10) may connect with each drain of the eleventh and twelfth power devices (IGBT11, and IGBT12), and each source of the eleventh and twelfth power devices (IGBT11, and IGBT12) may connect to ground.

A fifth PWM signal (PWM5) that is output from the fifth gate driving unit 232 may be input to each gate of the ninth and tenth power devices (IGBT9, and IGBT10). Additionally, a sixth PWM signal (PWM6) that is output from the sixth gate driving unit 234 may be input to the gate of the eleventh and twelfth power devices (IGBT11, and IGBT12).

Each of the ninth and tenth power devices (IGBT9, and IGBT10) may perform switching-on and switching-off operations in which the drain and source are opened and closed, based on the fifth PWM signal (PWM5) that is input to each gate of the ninth and tenth power devices (IGBT9, and IGBT10).

For instance, when the fifth PWM signal (PWM5) is at a high level, the ninth and tenth power devices (IGBT9, and IGBT10) may switch on to output positive cycle power of third AC power (Vac_W) to the motor 120. When the fifth PWM signal (PWM5) is at a low level, the ninth and tenth power devices (IGBT9, and IGBT10) may switch off to cut off positive cycle power of third AC power (Vac_W) supplied to the motor 120.

Each of the eleventh and twelfth power devices (IGBT11, and IGBT12) may perform switching-on and switching-off operations in which the drain and source are opened and closed, based on the sixth PWM signal (PWM6) that is input to each gate of the eleventh and twelfth power devices (IGBT11, and IGBT12).

The eleventh and twelfth power devices (IGBT11, and IGBT12) may switch on and switch off with the same method as that of the above-described third and fourth power devices (IGBT3, and IGBT4).

As described in FIG. 7, each of the fifth and sixth gate driving units 232, 234 may generate the fifth and sixth PWM signals (PWM5, and PWM6) on the basis of a third control signal (SC3) that is input from the control driver 250.

Referring to FIG. 9, first, second, and third driving units 210, 220, 230 may supply first to third AC power (Vac_U, Vac_V, and Vac_W) to a motor 120 based on control of first to third control signals (SC1, SC2, and SC3) that are input from a control circuit unit 250.

FIG. 9 illustrates an example in which first AC power (Vac_U) is supplied to a motor 120.

Each of the first and second gate driving units 212, 214 may generate first and second PWM signals (PWM1, and PWM2) based on a first control signal (SC1) that is delivered by a control driver 250.

In this case, the first PWM signal (PWM1) is a high-level signal that allows first and second power devices (IGBT1, and IGBT2) to switch on. Additionally, the second PWM signal (PWM2) is a low-level signal that allows third and fourth power devices (IGBT3, and IGBT4) to switch off.

That is, the first and second PWM signals (PWM1, and PSM2) have opposite signal levels.

A cycle of the first PWM signal (PWM1) that is supplied to the first and second power devices (IGBT1, and IGBT2) may be shorter than a cycle of the second PWM signal (PWM2) that allows the third and fourth power devices (IGBT3, and IGBT4) to switch off.

On the basis of the high-level signal, the first and second power devices (IGBT1, and IGBT2) may switch on, may covert DC power (Vdc) into first AC power (Vac_U) and may supply the converted first AC power (Vac_U) to the motor 120.

In this case, on the basis of the low-level signal, the third and fourth power devices (IGBT3, and IGBT4) may switch off.

Further, each of the third and fourth gate driving units 222, 224 may generate third and fourth PWM signals (PWM3, and PWM4) based on a second control signal (SC2) that is delivered by the control driver 250.

In this case, the third PWM signal (PWM3) is a low-level signal that allows fifth and sixth power devices (IGBT5, and IGBT6) to switch off. Additionally, the fourth PWM signal (PWM4) is a high-level signal that allows seventh and eighth power devices (IGBT7, and IGBT8) to switch on.

A cycle of the fourth PWM signal (PWM4) that is supplied to the seventh and eighth power devices (IGBT7, and IGBT8) may be shorter than a cycle of the third PWM signal (PWM3) that allows the third and fourth power devices (IGBT3, and IGBT4) to switch off.

Fifth and sixth gate driving units 232, 234 may generate fifth and sixth PWM signals (PWM5, and PWM6) based on a third control signal (SC3) that is delivered by the control driver 250.

The fifth PWM signal (PWM5) is a low-level signal that allows ninth and tenth power devices (IGBT9, and IGBT10) to switch off. Additionally, the sixth PWM signal (PWM6) is a high-level signal that allows eleventh and twelfth power devices (IGBT11, and IGBT12) to switch on.

The sixth PWM signal (PWM6) that allows the eleventh and twelfth power devices (IGBT11, and IGBT12) to switch on may be supplied at a point in time when the fourth PWM signal (PWM4) that is supplied to the seventh and eighth power devices (IGBT7, and IGBT8) becomes a low-level signal.

The first to third control signals (SC1 to SC3) may be provided to the first to sixth gate driving units 212, 214, 222, 224, 232, 234 at the same point in time.

Each of the first to sixth gate driving units 212, 214, 222, 224, 232, 234 generates the first to sixth PWM signals (PWM1 to PWM6) based on each of the first to third control signals (SC1 to SC3). Additionally, the first to sixth gate driving units 212, 214, 222, 224, 232, 234 may operate the first to sixth power device groups (PG1 to PG6) to convert input DC power (Vdc) into first to third AC power (Vac_U, Vac_V, and Vac_W) and to output the first to third AC power (Vac_U, Vac_V, and Vac_W) to the motor 120.

As an example, each of the first to sixth power device groups (PG1 to PG6) is described as including two power devices. However, the number of the power devices is not restricted.

The present disclosure that is described above may be replaced, changed and modified in different ways by one having ordinary skill in the art to which the disclosure pertains without departing from the technical spirit of the disclosure. Thus, the disclosure should not be construed as being limited to the embodiments and the attached drawings set forth herein.

The invention claimed is:

1. A power device of an electric vehicle, comprising:
   a motor housing that is configured to accommodate a motor; and
   an inverter housing that has a cylindrical shape having a first opened surface and a second opened surface, that is coupled to the motor housing, and that is configured to receive a shaft configured to deliver a driving force generated by the motor, the shaft penetrating the inverter housing; and
   an inverter module accommodated in the inverter housing and configured to supply a first alternating current (AC) power, a second AC power, and a third AC power to the motor,
   wherein the inverter module comprises:
      a direct current (DC)-link capacitor unit configured to maintain a voltage level corresponding to a DC power supplied by a battery,
      a first driving unit, a second driving unit, and a third driving unit that are disposed at the first opened surface, that are separated from one other, and that are configured to convert the DC power into the first AC power, the second AC power, and the third AC power and supply the first AC power, the second AC power, and the third AC power to the motor, and
      a control driver that is connected to each of the first driving unit, the second driving unit, and the third driving unit, that is disposed at the second opened surface, and that is configured to control the first driving unit, the second driving unit, and the third driving unit,
   wherein each of the first driving unit, the second driving unit, and the third driving unit comprises:
      a first conductive member connected to the DC-link capacitor unit and configured to provide the DC power to a corresponding driving unit among the first driving unit, the second driving unit, and the third driving unit, and
      a second conductive member connected to the control driver and configured to transmit a corresponding AC power among the first AC power, the second AC power, and the third AC power to the motor,
   wherein the DC-link capacitor unit comprises:
      a DC-link capacitor configured to maintain the voltage level corresponding to the DC power; and
      a support member coupled to the DC-link capacitor,
      a coupling protrusion that has a cylindrical shape having both sides open and that is coupled to the support member,
      a terminal protrusion that connects to each of the first conductive members, and
      a support protrusion configured to support the control driver,
   wherein the support member comprises a coupling unit coupled to the coupling protrusion, and
   wherein the support member defines first penetration holes that receive the first conductive members and second penetration holes that receive the second conductive members.

2. The power device of claim 1, wherein each of the first driving unit, the second driving unit, and the third driving unit comprises:
   a first power device group comprising two or more first power devices;

a second power device group comprising two or more second power devices;

a first gate driving unit configured to output a first pulse width modulation (PWM) signal to turn on and off the first power devices;

a second gate driving unit configured to output a second PWM signal to turn on and off the second power devices; and a connector unit configured to receive control signals from the control driver and transmit the first PWM signal to the first gate driving unit and the second PWM signal to the second gate driving unit.

3. The power device of claim 2, wherein the first gate driving unit and the second gate driving unit are configured to:

turn on the first power devices and the second power devices at a same point in time; or turn off the first power devices and the second power devices at a same point in time.

4. The power device of claim 2, wherein the first and second gate driving units are configured to covert an input DC power into an AC power and to output the AC power to the motor.

5. The power device of claim 2, wherein the first PWM signal and the second PWM signal have different signal levels from each other.

6. The power device of claim 5, wherein a first cycle corresponding to a pulse width of the first PWM signal is shorter than a second cycle corresponding to a pulse width of the second PWM signal.

7. The power device of claim 2, wherein the first power devices are connected to each other electrically in parallel, and the second power devices are connected to each other electrically in parallel.

8. The power device of claim 7, wherein the first power devices are configured to distribute a first DC power input to the first power device group, and the second power devices are configured to distribute a second DC power input to the second power device group.

9. The power device of claim 7, wherein the first power devices comprise a first power device comprising a first drain, a first source, and a first gate, wherein the second power devices comprise a second power device comprising a second drain, a second source, and a second gate, wherein the first drain is configured to receive an input DC power, the first source is connected to the second drain, and the first gate is configured to receive the first PWM signal, and wherein the second source is connected to a ground, and the second gate is configured to receive the second PWM signal.

10. The power device of claim 7, wherein the first power device group is configured to be turned on based on the first PWM signal corresponding to one of a low level signal or a high level signal, and wherein the second power device group is configured to be turned on based on the second PWM signal corresponding to the other of the low level signal or the high level signal.

11. The power device of claim 1, wherein the first driving unit, the second driving unit, and the third driving unit are arranged about a center of the inverter housing and spaced apart by an angle of 120 degrees about the center from adjacent driving units among the first driving unit, the second driving unit, and the third driving unit.

12. The power device of claim 11, wherein the shaft passes through the center of the inverter housing.

13. The power device of claim 1, wherein the DC-link capacitor unit defines a first central hole at a central region of the DC-link capacitor unit, wherein the control driver defines a second central hole at a central region of the control driver, wherein the first driving unit, the second driving unit, and the third driving unit define a third central hole at a central region of the first driving unit, the second driving unit, and the third driving unit, and wherein the first central hole, the second central hole, and the third central hole are configured to communicate one another and define a coolant passage configured to carry a coolant.

14. The power device of claim 1, wherein the control driver comprises a connection terminal, and the second conductive member passes through the connection terminal.

15. The power device of claim 14, wherein the connection terminal faces a lateral surface of the second conductive member.

16. The power device of claim 14, wherein the connection terminal is electrically connected to a via-hole defined in a printed circuit board of the control driver.

* * * * *